(12) United States Patent
Yoshioka et al.

(10) Patent No.: US 11,528,737 B2
(45) Date of Patent: Dec. 13, 2022

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP); Lihui Wang, Beijing (CN); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 81 days.

(21) Appl. No.: 17/054,443

(22) PCT Filed: May 11, 2018

(86) PCT No.: PCT/JP2018/018435
§ 371 (c)(1),
(2) Date: Nov. 10, 2020

(87) PCT Pub. No.: WO2019/215934
PCT Pub. Date: Nov. 14, 2019

(65) Prior Publication Data
US 2021/0235482 A1      Jul. 29, 2021

(51) Int. Cl.
*H04W 72/12*     (2009.01)
*H04L 1/18*      (2006.01)
*H04W 72/04*     (2009.01)

(52) U.S. Cl.
CPC ....... *H04W 72/1289* (2013.01); *H04L 1/1819* (2013.01); *H04L 1/1896* (2013.01); *H04W 72/0413* (2013.01); *H04W 72/0446* (2013.01); *H04W 72/1257* (2013.01)

(58) Field of Classification Search
CPC ......... H04W 72/1289; H04W 72/0413; H04W 72/0446; H04W 72/1257; H04L 1/1819; H04L 1/1896
USPC ........................................................ 370/329
See application file for complete search history.

(56) References Cited

U.S. PATENT DOCUMENTS 11,140,567 B2 * 10/2021 Tsai ...................... H04W 24/10
2019/0313342 A1 * 10/2019 Papasakellariou .... H04W 52/54

OTHER PUBLICATIONS

Extended European Search Report in counterpart European Application No. 18 91 8185.2 dated Nov. 24, 2021 (9 pages).
LG Electronics; "Discussion on HARQ-ACK feedback method for NR"; 3GPP TSG RAN WG1 Meeting #88 bis, R1-1704917; Spokane, USA; Apr. 3-7, 2017 (7 pages).

(Continued)

*Primary Examiner* — Peter G Solinsky
(74) *Attorney, Agent, or Firm* — Osha Bergman Watanabe & Burton LLP

(57) ABSTRACT

To appropriately generate HARQ-ACK codebook even when transmission timings of delivery confirmation signals are configured flexibly, a user terminal according to an aspect of the present disclosure includes a transmitting section that transmits a delivery confirmation signal for a downlink shared channel, based on downlink control information used for scheduling the downlink shared channel, and a control section that determines codebook for the delivery confirmation signal, based on at least one of a transmission slot of the delivery confirmation signal and an uplink control channel resource for the delivery confirmation signal that are indicated by the downlink control information.

5 Claims, 10 Drawing Sheets

(56) References Cited

OTHER PUBLICATIONS

LG Electronics; "Discussion on scheduling and HARQ feedback for NR"; 3GPP TSG RAN WG1 Meeting #88, R1-1702486; Athens, Greece; Feb. 13-17, 2017 (8 pages).
LG Electronics; "Support of HARQ-ACK multiplexing/bundling for NR"; 3GPP TSG RAN WG1 Meeting #90, R1-1713194; Prague, Czechia; Aug. 21-25, 2017 (9 pages).
Office Action issued in the counterpart Chilean Patent Application No. 202002918, dated Dec. 14, 2021 (19 pages).
Interdigital, Inc.; "Remaining issues on HARQ-ACK codebook"; 3GPP TSG RAN WG1 Meeting #92, R1-1802573; Athens, Greece, Feb. 26-Mar. 2, 2018 (4 pages).
Samsung; "Corrections on CA operation"; 3GPP TSG RAN WG1 Meeting #92bis, R1-1804381; Sanya, China, Apr. 16-20, 2018 (6 pages).
Samsung; "Summary on CA Aspects"; 3GPP TSG RAN WG1 #92bis, R1-1805277; Sanya, China, Apr. 16-20, 2018 (12 pages).
3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
International Search Report issued in PCT/JP2018/018435 dated Jul. 10, 2018 (5 pages).
Written Opinion of the International Searching Authority issued in PCT/JP2018/018435 dated Jul. 10, 2018 (3 pages).
Office Action in counterpart Japanese Patent Application No. 2020-517753 dated Apr. 19, 2022 (6 pages).
Office Action in counterpart Chilean Patent Application No. 202002918 dated Apr. 12, 2022 (19 pages).
CATT; "Remaining details of NR CA operation"; 3GPP TSG RAN WG1 Meeting #92, R1-1801740; Athens, Greece; Feb. 2 -Mar. 2, 2018 (6 pages).
CATT; "Open issues on HARQ-ACK feedback"; 3GPP TSG RAN WG1 Meeting AH 1801, R1-1800258; Vancouver, Canada; Jan. 22-26, 2018 (4 pages).
Samsung; "Corrections on CA operation"; 3GPP TSG RAN WG1 Meeting #92, R1-1801989; Athens, Greece; Feb. 26-Mar. 2, 2018 (9 pages).
OPPO; "Discussion on HARQ-ACK transmission"; 3GPP TSG RAN WG1 Meeting #91, R1-1719993 Reno, USA; Nov. 27-Dec. 1, 2017 (6 pages).
MediaTek, Inc.; "Remaining issues in carrier aggregation"; 3GPP TSG RAN WG1 Meeting #92bis, R1-1804046; Sanya, China; Apr. 16-20, 2018 (10 pages).
Office Action in counterpart Japanese Patent Application No. 2020-517753 dated Jul. 12, 2022 (7 pages).
Office Action in counterpart Australian Patent Application No. 2018423026 dated Jun. 30, 2022 (3 pages).
Nokia, Nokia Shanghai Bell; "Remaining open items on PUCCH resource allocation"; 3GPP TSG-RAN WG1 # 92, R1-1802026; Greece, Athens; Feb. 26-Mar. 2, 2018 (14 pages).

* cited by examiner

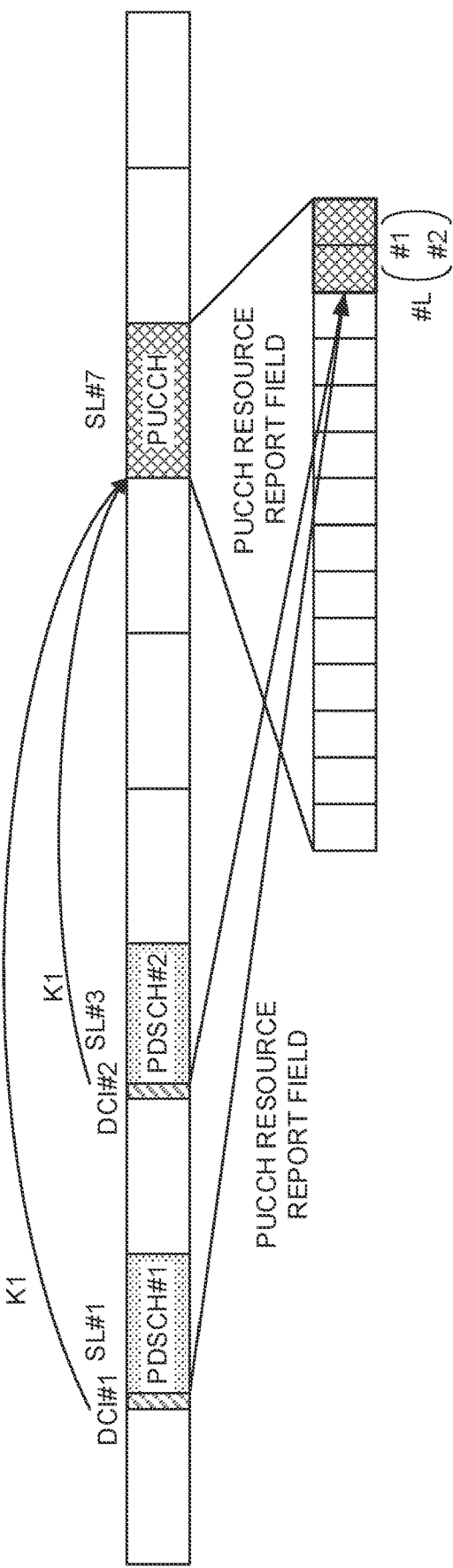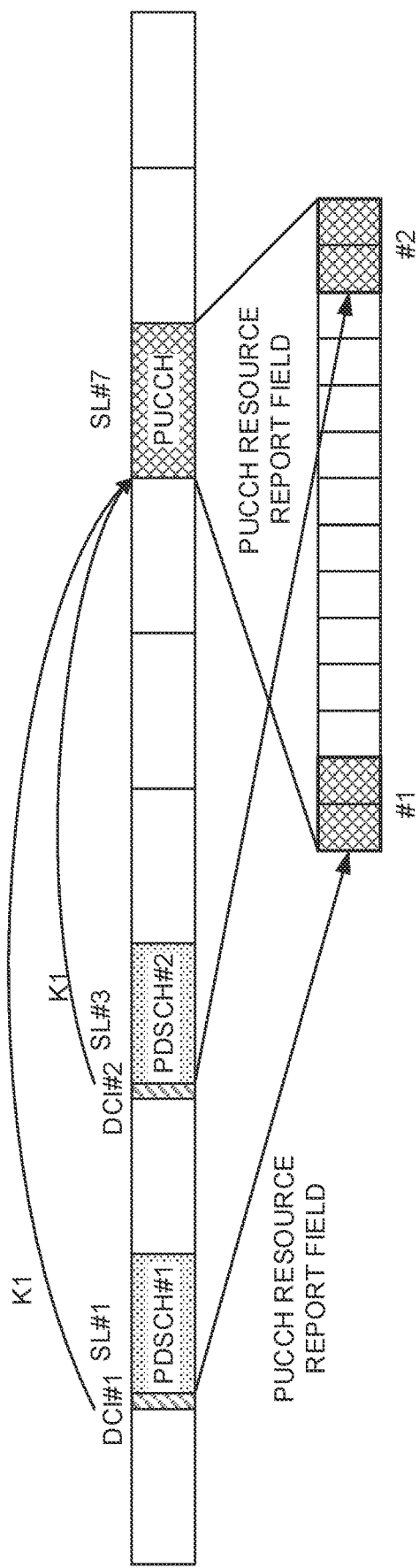

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency, and so on (see Non-Patent Literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel.14," "LTE Rel.15 (or later versions)," and so on).

In existing LTE systems (for example, LTE Rel.8 to Rel.13), downlink (DL) and/or uplink (UL) communications are carried out, using a subframe (also referred to as "transmission time interval (TTI)" and so on) of 1 ms. This subframe is a unit of time to transmit one data packet that is channel-coded, and is a processing unit in scheduling, link adaptation, retransmission control (HARQ (Hybrid Automatic Repeat reQuest)), and so on.

In existing LTE systems (for example, LTE Rel.8 to Rel.13), a user terminal transmits uplink control information (UCI) on an uplink control channel (for example, PUCCH: Physical Uplink Control Channel) or an uplink shared channel (for example, PUSCH: Physical Uplink Shared Channel). A configuration (format) of the uplink control channel is referred to as a PUCCH format and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel.15 (or later versions), 5G, 5G+, NR, and so on), a study is underway to determine, when UCI is transmitted on an uplink control channel (for example, a PUCCH), a resource for the uplink control channel (for example, a PUCCH resource), based on higher layer signaling and a certain field value in downlink control information (DCI).

For NR, a study is underway to indicate, to a UE, a transmission timing of a delivery confirmation signal (also referred to as an "HARQ-ACK") for a DL signal (for example, a PDSCH) by using DCI for scheduling the PDSCH. This sometimes causes a case where HARQ-ACKs corresponding to PDSCHs transmitted in different transmission periods (for example, slots) are transmitted in the same slot.

Considering that a UE transmits HARQ-ACKs as feedback, based on codebook (on a per codebook basis), a problem is how to control generation of HARQ-ACK codebook when a plurality of HARQ-ACKs are transmitted in the same slot. If HARQ-ACK codebook is not generated appropriately, this may cause deterioration in communication quality and so on.

Thus, an object of the present disclosure is to provide a user terminal and a radio communication method, in which HARQ-ACK codebook is generated appropriately even when transmission timings of delivery confirmation signals are configured flexibly.

Solution to Problem

A user terminal according to an aspect of the present disclosure includes a transmitting section that transmits a delivery confirmation signal for a downlink shared channel, based on downlink control information used for scheduling the downlink shared channel, and a control section that determines codebook for the delivery confirmation signal, based on at least one of a transmission timing of the delivery confirmation signal and an uplink control channel resource for the delivery confirmation signal that are indicated by the downlink control information.

Advantageous Effects of Invention

According to an aspect of the present disclosure, it is possible to appropriately generate HARQ-ACK codebook even when transmission timings of delivery confirmation signals are configured flexibly.

BRIEF DESCRIPTION OF DRAWINGS

FIG. 4A is a diagram to show an example of a method of transmitting HARQ-ACKs according to a second aspect, and FIG. 4B is a diagram to show another example of the method of transmitting HARQ-ACKs according to the second aspect;

DESCRIPTION OF EMBODIMENTS

Figure 1:
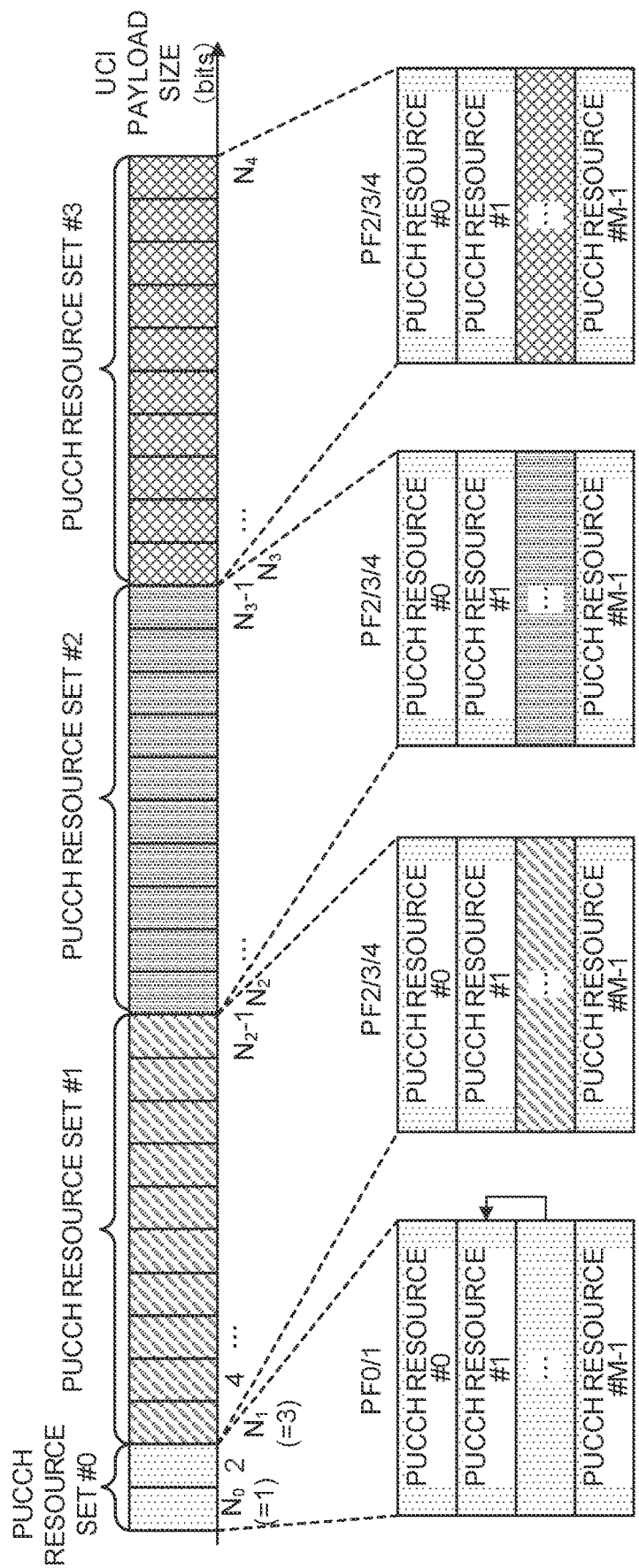
FIG. 1 is a diagram to show an example of PUCCH resource allocation.

For future radio communication systems (for example, LTE Rel.15 (or later versions), 5G, NR, and so on), a study about a configuration (also referred to as a "format," a "PUCCH format (PF)," and so on) for an uplink control channel (for example, a PUCCH) to be used for UCI transmission is underway. For example, in LTE Rel.15, a study is underway to support five kinds of PFs including PF0 to PF4. Note that the terms of PFs to be mentioned below are merely examples, and terms different from those may be used.

For example, PF0 and PF1 are PFs used for transmission of UCI of up to 2 bits (for example, also referred to as "delivery confirmation information (HARQ-ACK: Hybrid Automatic Repeat reQuest-Acknowledge)," "ACK" or "NACK," and so on). PF0 is assignable to one or two symbols and is hence also referred to as a "short PUCCH," a "sequence-based short PUCCH," and so on. In contrast, PF1 is assignable to four to 14 symbols and is hence also referred to as a "long PUCCH" and so on. In PF1, a plurality of user terminals may be code-division-multiplexed (CDMed) in the same PRB through block-wise spreading in terms of a time domain using at least one of CS and OCC.

PF2 to PF4 are PFs used for transmission of UCI of more than 2 bits (for example, channel state information (CSI) (or CSI and an HARQ-ACK and/or a scheduling request (SR))). PF2 is assignable to one to two symbols and is hence also referred to as a "short PUCCH" and so on. In contrast, PF3 and PF4 are assignable to four to 14 symbols and are hence also referred to as a "long PUCCH" and so on. In PF4, a plurality of user terminals may be CDMed through block-wise spreading in terms of (a frequency domain) before DFT.

Allocation of a resource (for example, a PUCCH resource) to be used for transmission of the uplink control channel is performed by using higher layer signaling and/or downlink control information (DCI). Here, higher layer signaling may be at least one of, for example, RRC (Radio Resource Control) signaling, system information (at least one of RMSI: Remaining Minimum System Information, OSI: Other system information, MIB: Master Information Block, SIB: System Information Block, for example), and broadcast information (PBCH: Physical Broadcast Channel).

Specifically, one or more sets (PUCCH resource sets) each including one or more PUCCH resources are notified to (configured for) a user terminal through higher layer signaling. For example, the user terminal may be notified about K (for example, 1≤K≤4) PUCCH resource sets from a radio base station. Each PUCCH resource set may include M (for example, 8≤M≤32) PUCCH resources.

The user terminal may determine a single PUCCH resource set from among the K PUCCH resource sets thus configured, based on the payload size of UCI (UCI payload size). The UCI payload size may be the number of bits of UCI not including bits of cyclic redundancy check (CRC (Cyclic Redundancy Code)).

The user terminal may determine a PUCCH resource to be used for a transmission of the UCI from among the M PUCCH resources included in the determined PUCCH resource set, based on at least one of the DCI and implicit information (also referred to as an "implicit indication information," an "implicit index," and so on).

FIG. 1 is a diagram to show an example of PUCCH resource allocation. In FIG. 1, as an example, it is assumed that K is four (K=4) and that four PUCCH resource sets #0 to #3 are configured for the user terminal by the radio base station through higher layer signaling. It is also assumed that each of PUCCH resource sets #0 to #3 includes M (for example, 8≤M≤32) PUCCH resources #0 to #M-1. Note that the numbers of PUCCH resources included in the respective PUCCH resource sets may be the same or different.

As shown in FIG. 1, when PUCCH resource sets #0 to #3 are configured for the user terminal, the user terminal selects any one of the PUCCH resource sets, based on a UCI payload size.

For example, when the UCI payload size is one or two bits, PUCCH resource set #0 is selected. When the UCI payload size is three bits or more to up to $N_2$-1 bits, PUCCH resource set #1 is selected. When the UCI payload size is $N_2$ bits or more to up to $N_3$-1 bits, PUCCH resource set #2 is selected. Similarly, when the UCI payload size is $N_3$ bits or more to up to $N_3$-1 bits, PUCCH resource set #3 is selected.

In this way, the range of UCI payload size for which PUCCH resource set #i (i=0, . . . , K−1) is selected is expressed as $N_i$ bits or more to up to $N_{i+1}$-1 bits (in other words, $\{N_i, \ldots N_{i+1}-1\}$ bits).

Here, the start positions (start bit numbers) $N_0$ and $N_1$ of the UCI payload sizes for PUCCH resource sets #0 and #1 may be 1 and 3, respectively. In this case, PUCCH resource set #0 is selected when UCI of up to 2 bits is transmitted, and hence PUCCH resource set #0 may include PUCCH resources #0 to #M-1 for at least one of PF0 and PF1. In contrast, any one of PUCCH resource sets #1 to #3 is selected when UCI of more than 2 bits is transmitted, and hence each of PUCCH resource sets #1 to #3 may include PUCCH resources #0 to #M-1 for at least one of PF2, PF3, and PF4.

In NR, by using DCI for scheduling a PDSCH, a transmission timing (for example, K1) of an HARQ-ACK for the PDSCH is notified to a UE. K1 may be information related to a slot in which the PUCCH resource is configured.

The UE controls a transmission of an HARQ-ACK, based on a PUCCH resource set notified from a base station and an HARQ-ACK transmission timing notified by using the DCI for scheduling the PDSCH. The transmission of the HARQ-ACK is controlled by using HARQ-ACK codebook (on a per HARQ-ACK codebook basis).

Figure 2:
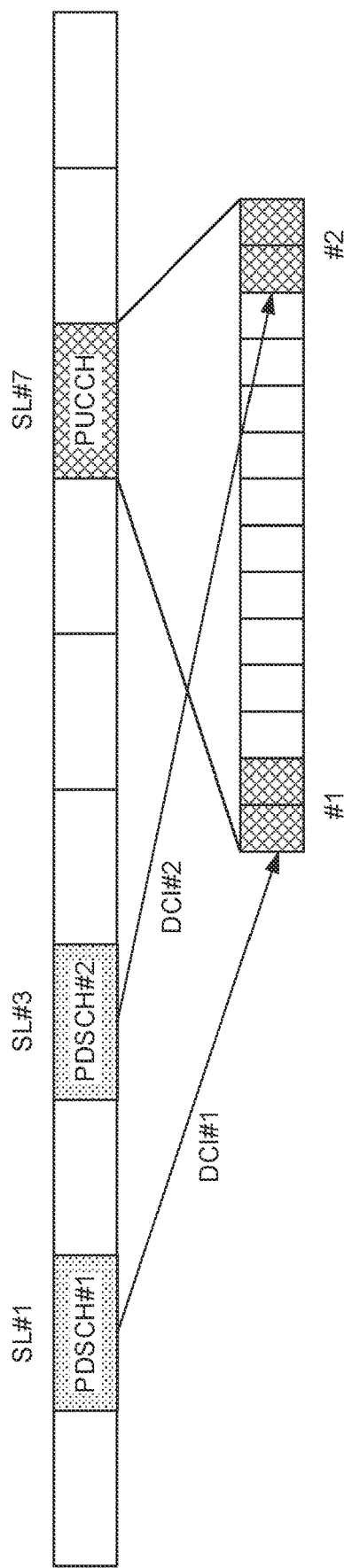
FIG. 2 is a diagram to show an example of a method of transmitting HARQ-ACKs corresponding to different PDSCHs.

Since a transmission timing of an HARQ-ACK for each PDSCH can be configured flexible by using DCI, the transmission timings of the HARQ-ACKs for PDSCHs transmitted in different slots may be configured in the same slot in some cases (refer to FIG. 2).

FIG. 2 shows a case in which the transmission timings of HARQ-ACK #1 for a PDSCH transmitted in slot (SL_#1) and HARQ-ACK #2 for a PDSCH transmitted in slot (SL_#3) are configured in the same slot (here, slot (SL_#7)). For example, when K1 included in DCI #1 for scheduling PDSCH #1 is six (K1=6) and K1 included in DCI #2 for scheduling PDSCH #2 is four (K1=4), the transmission timings of HARQ-ACK #1 and HARQ-ACK #2 are configured in the same slot (SL_#7).

In this case, a problem is how to control transmissions of HARQ-ACK #1 and HARQ-ACK #2, for example, how to generate HARQ-ACK codebook in slot (SL_#7).

It is determined, in standards, that the user terminal to notify HARQ-ACKs determines a PUCCH resource, based on the last DCI format detected by the user terminal. In the example shown in FIG. 2, when HARQ-ACK #1 is transmitted by using PUCCH resource #1 indicated by DCI #1 and HARQ-ACK #2 is transmitted by using PUCCH resource #2 indicated by DCI #2, HARQ-ACK #1 and HARQ-ACK #2 are set in different pieces of HARQ-ACK codebook, and this indicates that the user terminal interprets each of DCI #1 and DCI #2 as the last DCI format.

In contrast, when the user terminal interprets DCI #2 as the last DCI format, the user terminal sets HARQ-ACK #1 and HARQ-ACK #2 in the same HARQ-ACK codebook and transmits HARQ-ACK #1 and HARQ-ACK #2 by using PUCCH resource #2. As can be seen from above, it is not necessarily apparent about a range of HARQ-ACKs to be transmitted together in the same PUCCH resource.

The inventors of the present invention have focused on transmission timings (indicated slots) and PUCCH resources to be used for transmissions, which are parameters related to HARQ-ACK transmissions, and come up with the idea of controlling HARQ-ACK transmissions (for example, generation of HARQ-ACK codebook), based on these parameters.

Embodiments according to the present invention will be described in detail with reference to the drawings as follows. Aspects to be described below may be employed independently or may be employed in combination. Note that, in the following description, "PUCCH resource" and "PUCCH format" may be suitably interpreted as one another.

(First Aspect)

In a first aspect, generation of HARQ-ACK codebook is controlled based on HARQ-ACK transmission timings (for example, slots to which PUCCH resources are allocated) notified by DCI.

In the first aspect, such control is performed as to set, when HARQ-ACK transmission timings (slots) notified by using DCI are the same, the HARQ-ACKs to be transmitted in the same slot, in the same HARQ-ACK codebook.

For example, assume a case where pieces of DCI for scheduling a plurality of respective PDSCHs indicate the same slot as HARQ-ACK transmission timings (slots to which PUCCH resources are allocated). In this case, in the first aspect, one or more HARQ-ACKs included in the same slot are set in the same HARQ-ACK codebook.

In this way, when HARQ-ACK transmission timings (slots) notified by DCI are the same, a user terminal controls generation of HARQ-ACK codebook so that the HARQ-ACKs would be set in the same HARQ-ACK codebook. The HARQ-ACK codebook in which the plurality of HARQ-ACKs are set is transmitted together by using a certain PUCCH resource. The certain PUCCH resource may be, for example, a PUCCH resource determined based on the last DCI format detected by the user terminal.

Figure 3:
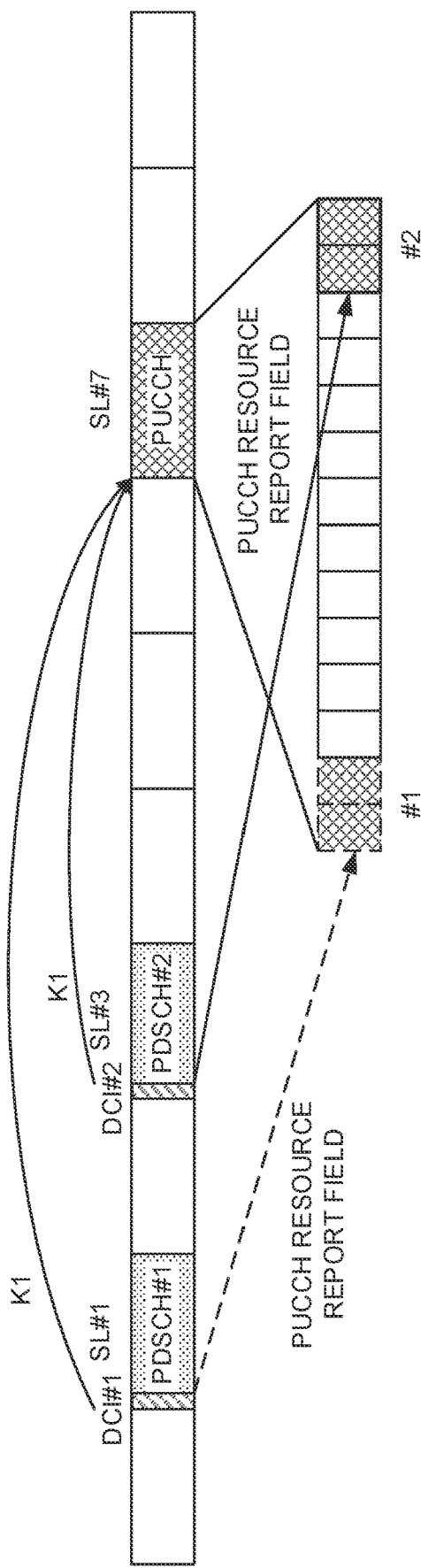
FIG. 3 is a diagram to show an example of a method of transmitting HARQ-ACKs according to a first aspect.

A description will be given of control of HARQ-ACK codebook and HARQ-ACK feedback using PUCCHs, with reference to FIG. 3.

The user terminal receives, in slot (SL #1), PDSCH #1 scheduled by DCI #1 and receives, in slot (SL #3), PDSCH #2 scheduled by DCI #2. In the present example, regarding DCI #1 and DCI #2, DCI #2 is interpreted as the last DCI detected by the user terminal.

DCI #1 schedules PDSCH #1, and parameter K1 (=6) set in DCI #1 indicates the slot in which an HARQ-ACK for PDSCH #1 is to be transmitted. DCI #2 schedules PDSCH #2, and parameter K1 (=4) set in DCI #2 indicates the slot in which an HARQ-ACK for PDSCH #2 is to be transmitted. In the present example, DCI #1 and DCI #2 indicate same slot (SL #7).

Furthermore, a PUCCH indicator field included in DCI #1 indicates PUCCH resource #1, and a PUCCH indicator field included in DCI #2 indicates PUCCH resource #2. The first two symbols of slot (SL #7) are allocated for PUCCH resource #1, and the last two symbols of slot (SL #7) are allocated for PUCCH resource #2.

The user terminal detects DCI #1 and DCI #2 in slot (SL #1) and slot (SL #3), respectively, demodulates PDSCH #1 and PDSCH #2, based respectively on DCI #1 and DCI #2, and determines HARQ-ACK #1 and HARQ-ACK #2 for PDSCH #1 and PDSCH #2, respectively.

The user terminal controls generation of HARQ-ACK codebook, based on HARQ-ACK transmission timings (for example, slots to which PUCCH resources are assigned) notified by DCI #1 and DCI #2. Specifically, the user terminal recognizes that the HARQ-ACK transmission timings (slots) notified by DCI #1 and DCI #2 are same slot (SL #7). Based the recognition result, the user terminal generates HARQ-ACK codebook for setting HARQ-ACK #1 and HARQ-ACK #2 respectively for PDSCH #1 and PDSCH #2, in the same HARQ-ACK codebook.

According to the first aspect, even when a plurality of pieces of DCI (PUCCH indicator fields), DCI #1 and DCI #2, indicate different PUCCH resources #1 and #2, a plurality of HARQ-ACKs, HARQ-ACK #1 and HARQ-ACK #2, are set in the same HARQ-ACK codebook if the indicated slots are the same.

The user terminal assigns the HARQ-ACK codebook in which the plurality of HARQ-ACKs, HARQ-ACK #1 and HARQ-ACK #2, are set, to a certain PUCCH resource. In the present example, DCI #2 is interpreted as the last DCI detected by the user terminal. The user terminal recognizes, based on the PUCCH indicator field included in DCI #2, that the last two symbols of slot (SL #7) are allocated for PUCCH resource #2.

The user terminal then assigns the HARQ-ACK codebook in which the plurality of HARQ-ACKs, HARQ-ACK #1 and HARQ-ACK #2, are set, to PUCCH resource #2 corresponding to the last two symbols of slot (SL #7). Consequently, the HARQ-ACKs for PDSCH #1 and PDSCH #2 are transmitted as feedback by using the PUCCH resource corresponding to the last two symbols of slot (SL #7).

In this way, determination of a PUCCH resource can be performed based on the PUCCH resource indicator field in the last DCI (for example, DCI format 1_0 or DCI format 1_1) detected by a UE among DCI indicating the same slot for HARQ-ACK feedback.

As described above, when slots (for example, slots in which PUCCHs are configured) indicated by DCI are the same, a plurality of HARQ-ACKs are set in the same HARQ-ACK codebook. Hence, the UE generates single codebook in a certain slot, based on HARQ-ACK transmission timings, which can reduce the processing load of the UE. Note that, although a PUCCH resource to be used is a resource indicated by DCI transmitted last, in the above description, a PUCCH resource to be used is not limited to this, and a resource indicated by DCI transmitted first may be used instead.

(Second Aspect)

In a second aspect, generation of HARQ-ACK codebook is controlled based on configured PUCCH resources in addition to HARQ-ACK transmission timings (for example, slots to which PUCCH resources are allocated) notified by DCI.

For example, assume a case where pieces of DCI for scheduling a plurality of respective PDSCHs indicate the same HARQ-ACK transmission timing (slot) and additionally indicate the same PUCCH resource. In this case, in the second aspect, a plurality of HARQ-ACKs for a plurality of PDSCHs are set in the same HARQ-ACK codebook.

In this way, when HARQ-ACK transmission timings (slots) notified by DCI are the same and PUCCH resources notified by the DCI are the same, a user terminal controls generation of HARQ-ACK codebook so that the HARQ-ACKs would be set in the same HARQ-ACK codebook.

The HARQ-ACK codebook in which the plurality of HARQ-ACKs are set is transmitted together by using a PUCCH resource indicated by the DCI. When PUCCH resources notified by DCI are different, even if HARQ-ACK transmission timings (slots) notified by the DCI are the same, the user terminal controls generation of HARQ-ACK codebook so that the HARQ-ACKs would be set in different pieces of HARQ-ACK codebook.

A description will be given of control of HARQ-ACK codebook and HARQ-ACK feedback using PUCCHs, with reference to FIG. 4A. The user terminal receives, in slot (SL #1), PDSCH #1 scheduled by DCI #1 and receives, in slot (SL #3), PDSCH #2 scheduled by DCI #2.

DCI #1 schedules PDSCH #1, and parameter K1 (=6) set in DCI #1 indicates slot (SL #7) in which an HARQ-ACK for PDSCH #1 is to be transmitted. DCI #2 schedules PDSCH #2, and parameter K1 (=4) set in DCI #2 indicates slot (SL #7) in which an HARQ-ACK for PDSCH #2 is to be transmitted.

In addition, a PUCCH indicator field included in DCI #1 indicates PUCCH resource #L, and a PUCCH indicator field included in DCI #2 indicates PUCCH resource #L. In other words, the PUCCH indicator fields included in DCI #1 and DCI #2 indicate same PUCCH resource #L. The last two symbols of slot (SL #7) are allocated to PUCCH resource #L.

The user terminal detects DCI #1 and DCI #2 in slot (SL #1) and slot (SL #3), respectively, demodulates PDSCH #1 and PDSCH #2, based respectively on DCI #1 and DCI #2, and determines HARQ-ACK #1 and HARQ-ACK #2 for PDSCH #1 and PDSCH #2, respectively. The user terminal controls generation of HARQ-ACK codebook, based on HARQ-ACK transmission timings (slots) and PUCCH resources notified by DCI #1 and DCI #2.

Specifically, in the example shown in FIG. 4A, the HARQ-ACK transmission timings (slot (SL #7)) notified by DCI #1 and DCI #2 are the same, and additionally the PUCCH resources are the same (PUCCH resource #L). When HARQ-ACK transmission timings (slot (SL #7)) notified by DCI #1 and DCI #2 are the same and additionally PUCCH resources (PUCCH resource #L) are the same, the user terminal generates HARQ-ACK codebook for setting HARQ-ACK #1 and HARQ-ACK #2 for PDSCH #1 and PDSCH #2 in the same HARQ-ACK codebook.

In the second aspect, when PUCCH resources notified by DCI are different, HARQ-ACK #1 and HARQ-ACK #2 are set in different pieces of HARQ-ACK codebook even if slots are the same. As shown in FIG. 4B, a case is assumed where HARQ-ACK transmission timings (slot (SL #7)) notified by DCI #1 and DCI #2 are the same while PUCCH resources #1 and #2 are different in DCI #1 and DCI #2.

In this case, HARQ-ACK #1 for PDSCH #1 is set in HARQ-ACK codebook and assigned to PUCCH resource #1 indicated by DCI #1. In contrast, HARQ-ACK #2 for PDSCH #2 is set in another HARQ-ACK codebook and assigned to PUCCH resource #2 indicated by DCI #2.

In this way, determination of a PUCCH resource can be performed based on the PUCCH resource indicator field in the last DCI (for example, DCI format 1_0 or DCI format 1_1) detected by a UE among DCI indicating the same slot for HARQ-ACK feedback and indicating the same PUCCH resource in the slot.

As described above, adding, to a condition, PUCCH resources being the same as well as slots being the same allows flexible control of the number of HARQ-ACKs set in the same HARQ-ACK codebook and the number of HARQ-ACKs put together in the same PUCCH resource. This also enables HARQ-ACK transmissions using different PUCCH resources in the same slot.

(Third Aspect)

In a third aspect, generation of HARQ-ACK codebook is controlled based on whether or not configured PUCCH resources overlap in the time domain.

For example, assume a case where pieces of DCI for scheduling a plurality of respective PDSCHs indicate PUCCH resources overlapping in the time domain. In this case, a plurality of HARQ-ACKs for the plurality of PDSCHs may be set in the same HARQ-ACK codebook. In other words, when PUCCH resources indicated by the DCI for scheduling the PDSCHs overlap in the time domain, the same HARQ-ACK codebook is used for the HARQ-ACKs for the respective PDSCHs. Note that this case corresponds to a case where the pieces of DCI for scheduling the plurality of respective PDSCHs indicate the same HARQ-ACK transmission timing (slot).

PUCCH resources overlapping in the time domain may correspond to any of the following cases.

Case 1: Case where a plurality of PUCCH resources completely overlap in the time domain Case 2: Case where a plurality of PUCCH resources at least partially overlap Case 3: Case where both of or either of start symbols and end symbols of respective PUCCH resources are the same Note that Case 1 may be a case where one PUCCH resource is included in the range of another PUCCH resource.

In this way, by setting, in the same codebook, HARQ-ACKs corresponding to PUCCH resources configured to overlap in the time domain, it is possible to appropriately transmit a plurality of HARQ-ACKs while avoiding any collision even when different PUCCH resources overlap in the time domain.

When PUCCH resources partially overlap, the PUCCH resource to be used for HARQ-ACK feedback may be the PUCCH resource indicated by DCI notified last. For example, determination of a PUCCH resource can be performed based on the PUCCH resource indicator field in the last DCI (for example, DCI format 1_0 or DCI format 1_1) detected by a UE among DCI indicating the same slot for HARQ-ACK feedback and indicating PUCCH resources partially or completely overlapping in the slot.

(Variations)

A different one of an HARQ-ACK codebook control mode based on the first aspect, an HARQ-ACK codebook control mode based on the second aspect, and an HARQ-ACK codebook control mode based on the third aspect may be employed according to a certain state. Note that such a configuration as to select any of the three control modes or a configuration as to define two control modes of the three control modes and select either of the control modes according to states, may be employed. The certain state may be service type. For example, eMBB (enhanced Mobile Broad-Band) is a service type with high speed and large capacity (referred to as a "first service type"), and URLLC (Ultra-Reliable and Low Latency Communications) is a service type with ultra-high reliability and low latency (referred to as a "second service type").

When the first service type is used, the HARQ-ACK codebook control mode based on the first aspect is employed; when the second service type is used, the HARQ-ACK codebook control mode based on the second aspect (or the third aspect) is employed.

The control mode based on the first aspect causes a strong tendency that a plurality of HARQ-ACKs concentrates on a particular PUCCH resource and is hence not preferable in terms of low latency. Since URLLC is a service type with ultra-high reliability and low latency, it is estimated, for many cases, that the control mode based on the second aspect (or the third aspect) rather than the first aspect is preferable in terms of low latency. In view of this, when the second service type is used, the control mode based on the second aspect is employed.

The user terminal may be indicated about a service type by a network by using at least one of a higher layer parameter, DCI, and SR. Alternatively, when a PDCCH is repeatedly transmitted, the user terminal may recognize a service type by using at least one of a duration of PUCCH repetitions and a period to a slot in which a PUCCH is to be transmitted.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 5:
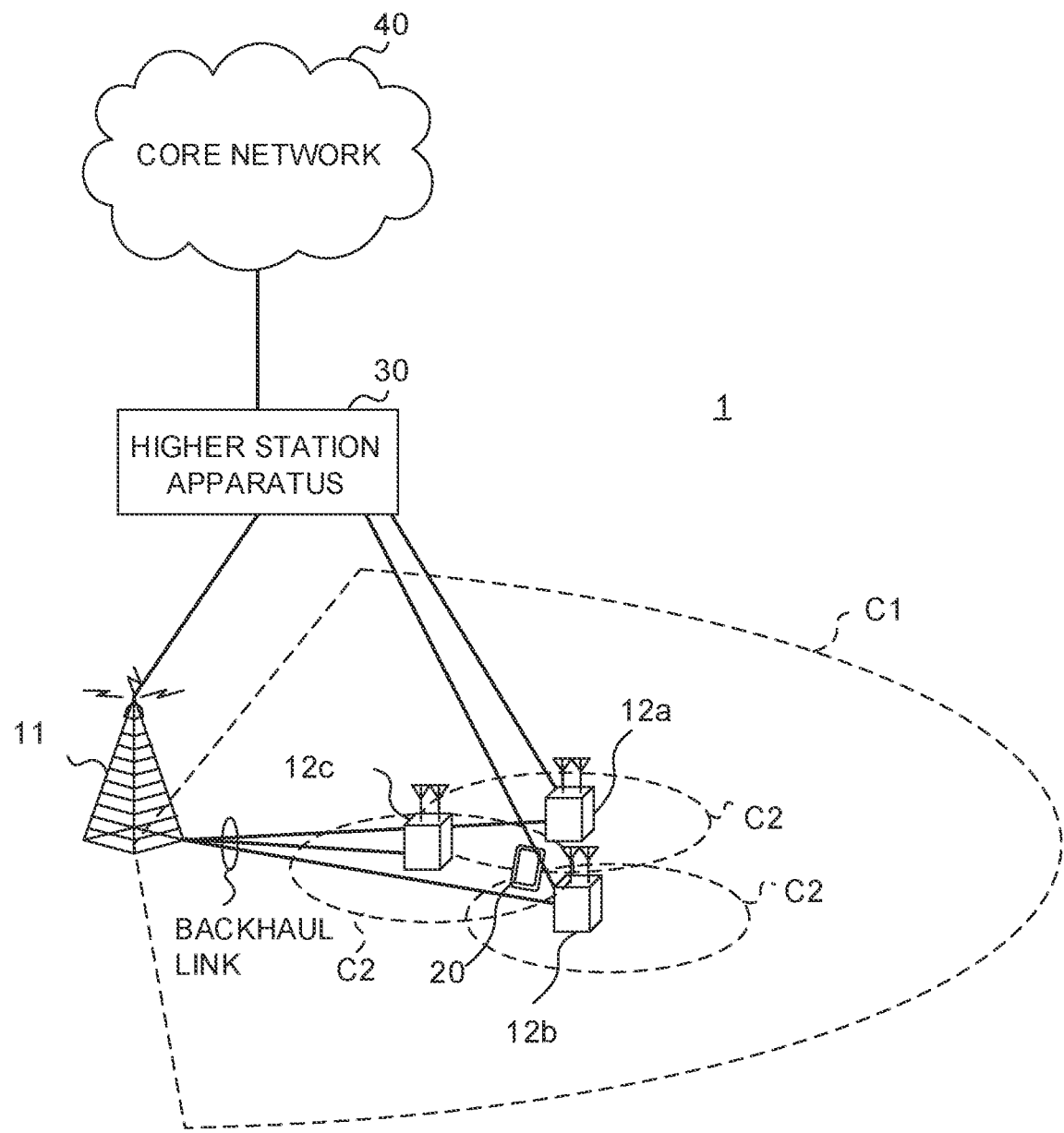
FIG. 5 is a diagram to show an example of a schematic structure of a radio communication system according to one embodiment.

FIG. 5 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LIE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs) (for example, up to five CCs or more than six CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be notified by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Delivery confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
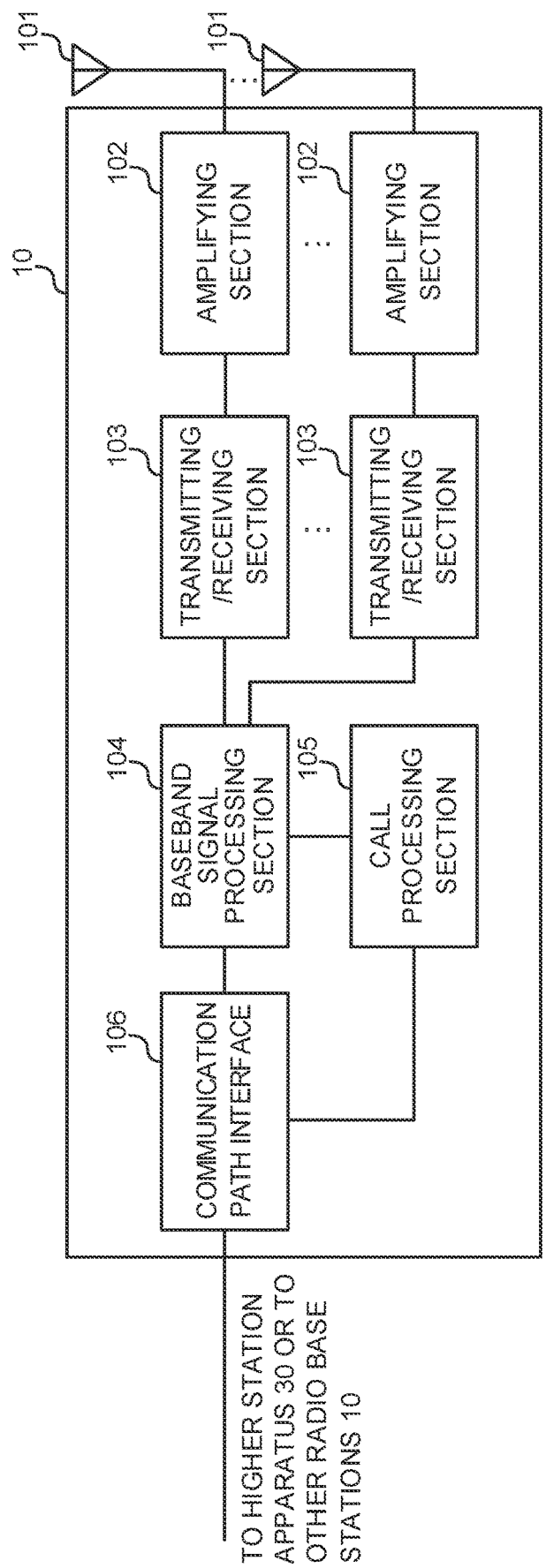
FIG. 6 is a diagram to show an example of an overall structure of a radio base station according to one embodiment.

FIG. 6 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section 103 in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmits DCI and PDSCHs on a per slot basis. DCI includes information for scheduling a PDSCH. Parameter K1 is set in DCI and indicates the slot in which an HARQ-ACK for the PDSCH is to be transmitted. For example, a plurality of pieces of DCI indicate slot 6. In addition, the PUCCH indicator fields included in the DCI indicate the same or different PUCCH resources.

Figure 7:
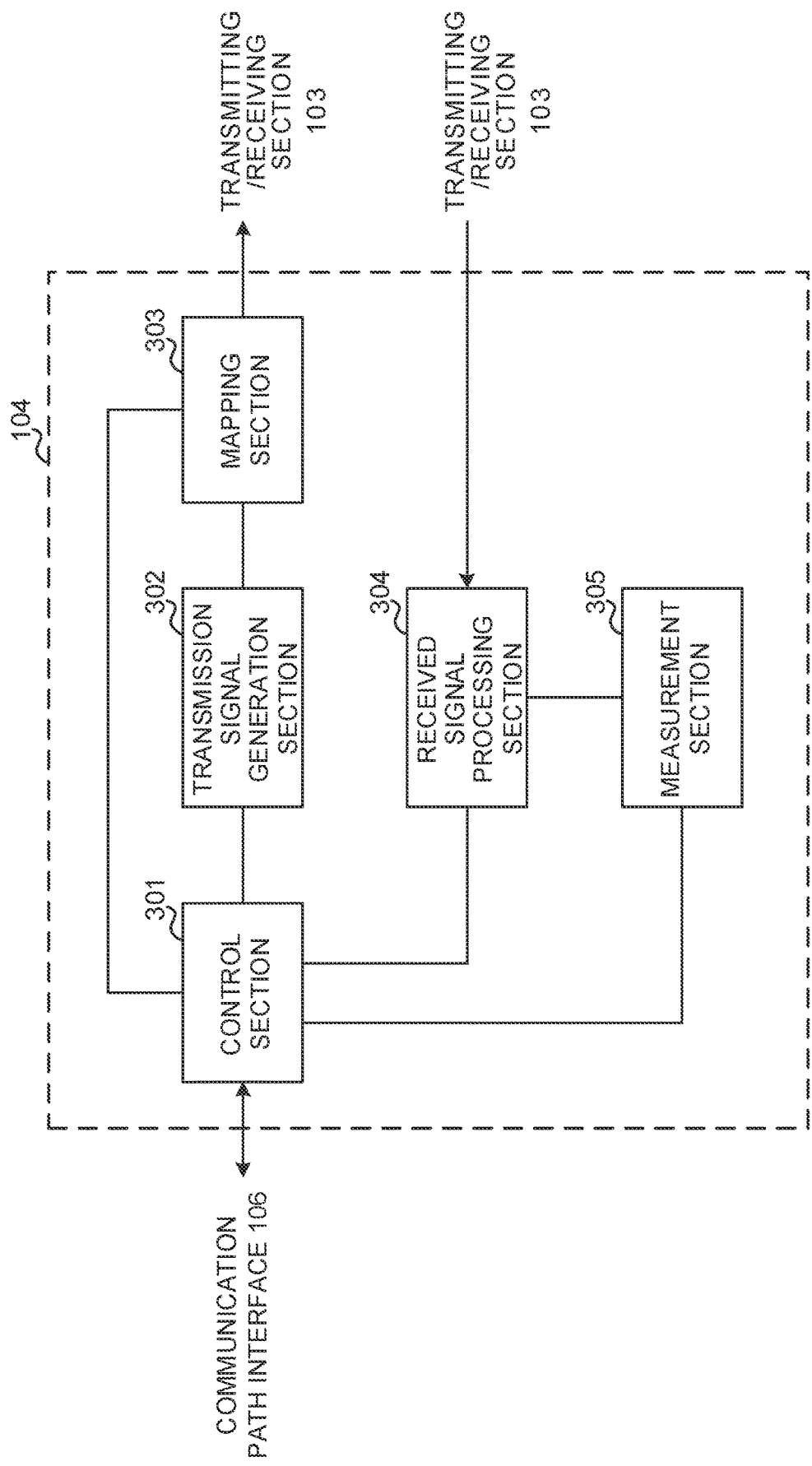
FIG. 7 is a diagram to show an example of a functional structure of the radio base station according to one embodiment.

FIG. 7 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource allocation) of system information, a downlink data signal (for example, a signal transmitted on the PDSCH), a downlink control signal (for example, a signal transmitted on the PDCCH and/or the EPDCCH, delivery confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted on the PUSCH), an uplink control signal (for example, a signal transmitted on the PUCCH and/or the PUSCH, delivery confirmation information, and so on), a random access preamble (for example, a signal transmitted on the PRACH), an uplink reference signal, and so on.

The control section 301 generates DCI and information of a PDSCH on a per slot basis. DCI includes information for scheduling a PDSCH. Parameter K1 is set in DCI. In addition, the PUCCH indicator fields included in DCI indicate the same or different PUCCH resources.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to notify assignment information of downlink data and/or UL grant to notify assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

Figure 8:
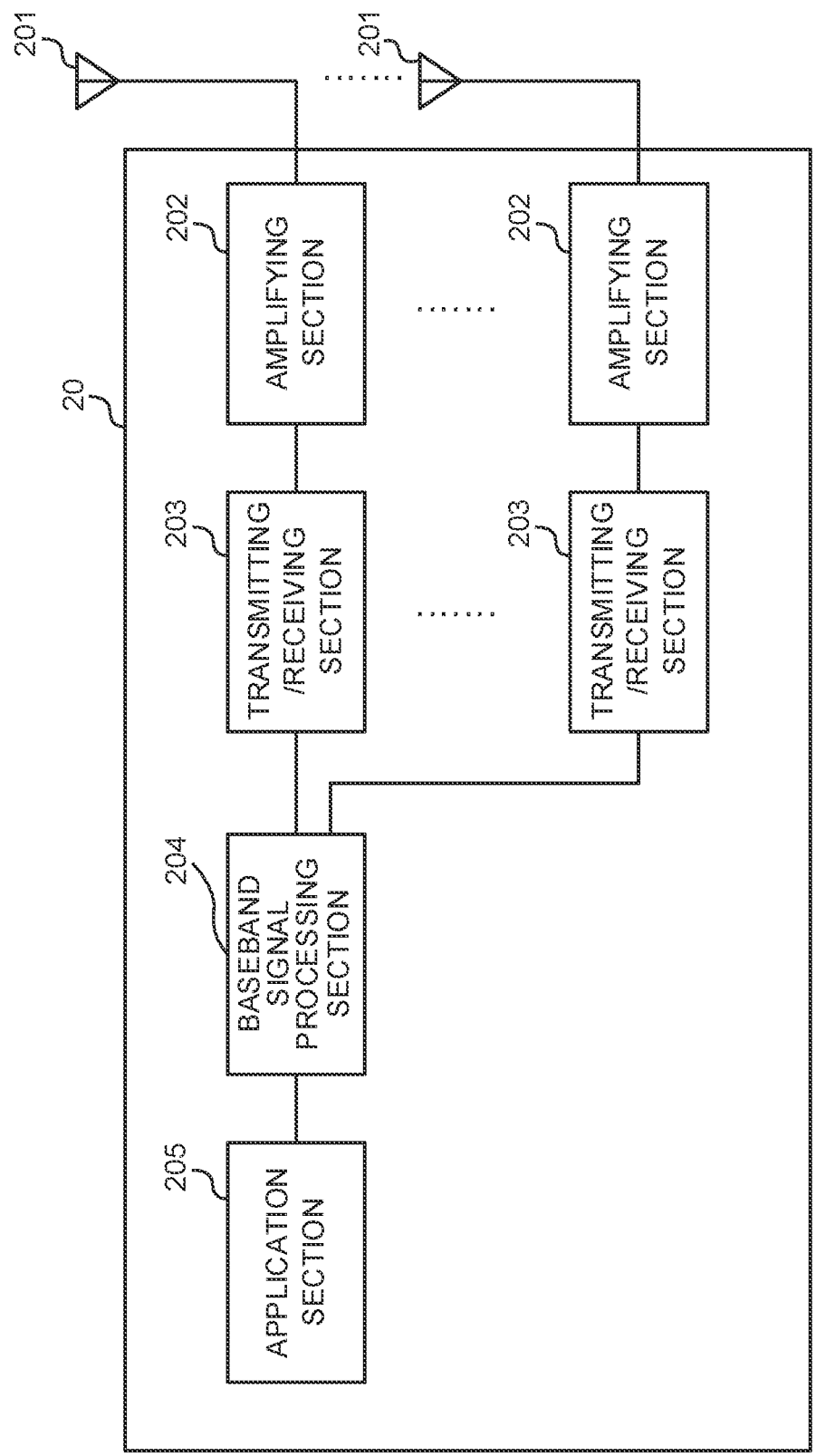
FIG. 8 is a diagram to show an example of an overall structure of a user terminal according to one embodiment.

FIG. 8 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive DCI and PDSCHs via downlink (refer to FIG. 3 and FIGS. 4A and 4B) and transmit HARQACKs for the PDSCHs via uplink.

Figure 9:
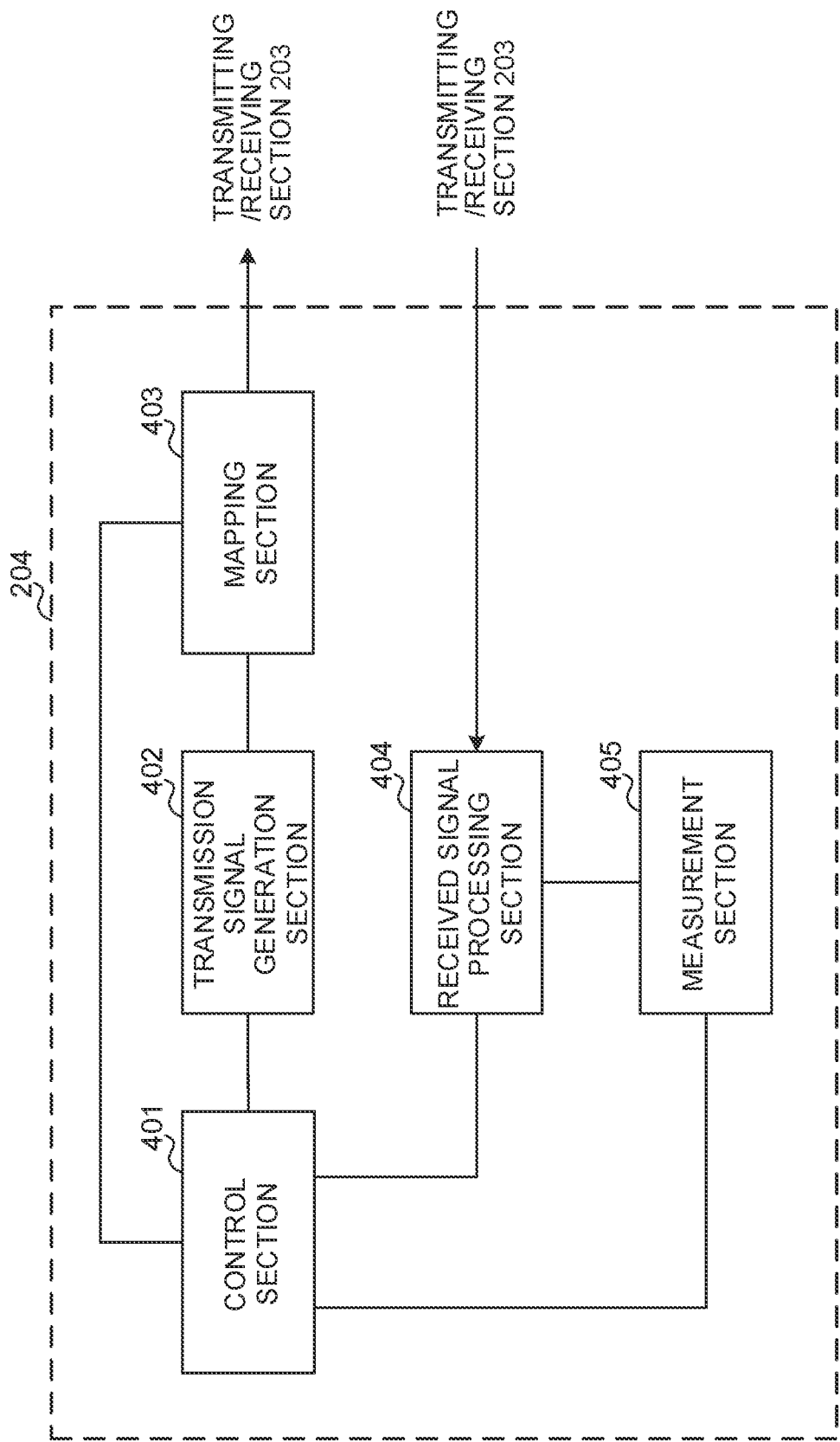
FIG. 9 is a diagram to show an example of a functional structure of the user terminal according to one embodiment.

FIG. 9 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

When HARQ-ACK transmission timings (slots) notified by DCI are the same, the control section 401 performs such control as to set HARQ-ACKs to be transmitted in the same slot, in the same HARQ-ACK codebook (first aspect). For example, the control section 401 allocates the HARQ-ACK codebook in which a plurality of HARQ-ACKs, HARQ-ACK #1 and HARQ-ACK #2, are set, to a certain PUCCH resource, to transmit the HARQ-ACKs for the PDSCHs as feedback by using the PUCCH resource.

Alternatively, the control section 401 controls generation of HARQ-ACK codebook, based on configured PUCCH resources in addition to HARQ-ACK transmission timings (for example, slots to which PUCCH resources are assigned) notified by DCI (second aspect). For example, when pieces of DCI for scheduling a plurality of respective PDSCHs indicate the same HARQ-ACK transmission timing (slot) and additionally indicate the same PUCCH resource, the plurality of HARQ-ACKs for a plurality of PDSCHs are set in the same HARQ-ACK codebook (FIG. 4A). In contrast, when PUCCH resources notified by DCI are different, a plurality of HARQ-ACKs and HARQ-ACK are set in different pieces of HARQ-ACK codebook even if slots notified by the DCI are the same (FIG. 4B).

The control section 401 may employ a different one of the HARQ-ACK codebook control mode based on the first aspect and the HARQ-ACK codebook control mode based on the second aspect, according to the certain state. When the first service type is used, the HARQ-ACK codebook control mode based on the first aspect is employed; when the second service type is used, the HARQ-ACK codebook control mode based on the second aspect is employed.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is notified from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 10:
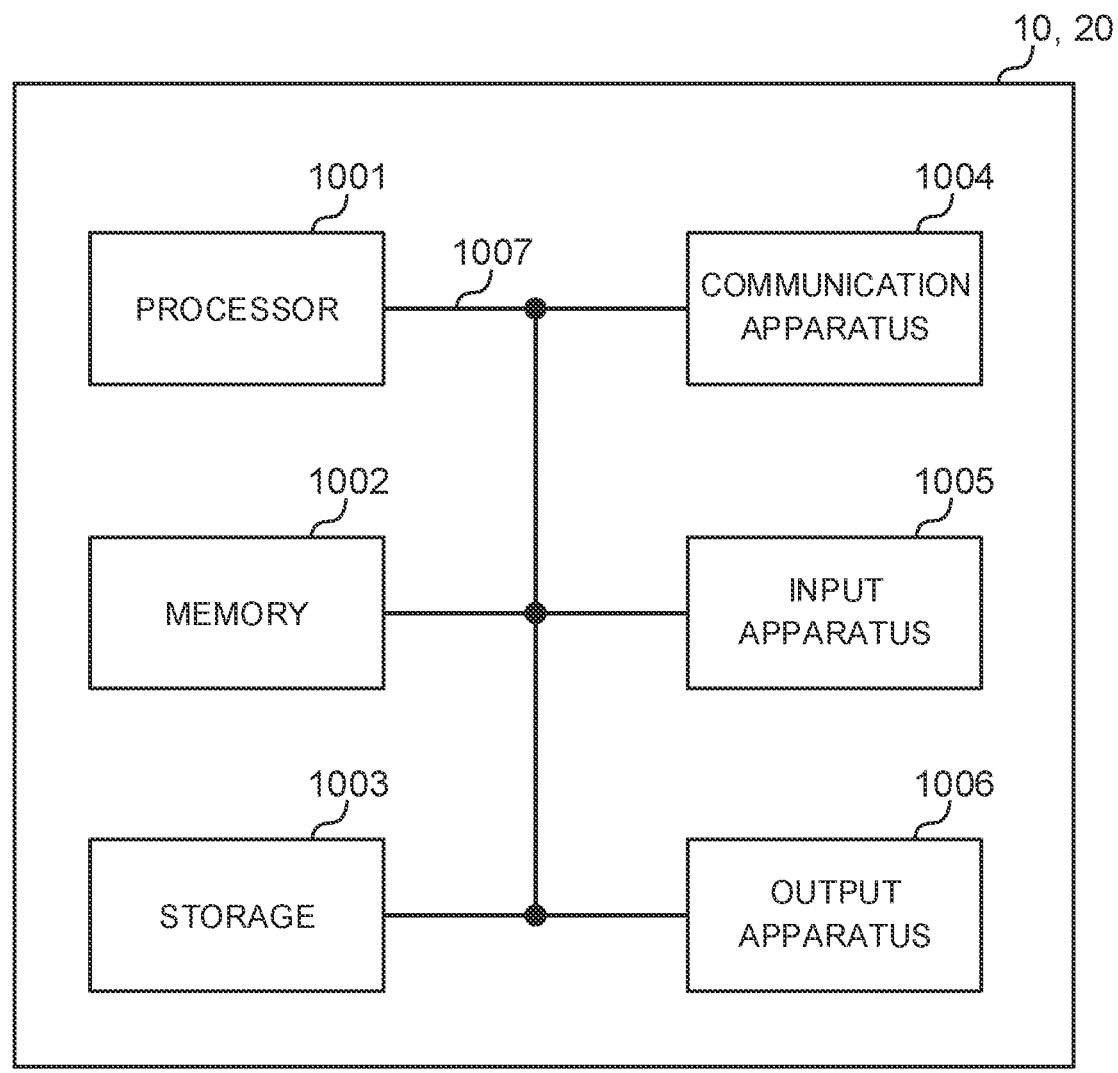
FIG. 10 is a diagram to show an example of a hardware structure of the radio base station and the user terminal according to one embodiment.

For example, a radio base station, a user terminal, and so on according to one embodiment of the present invention may function as a computer that executes the processes of the radio communication method of the present invention. FIG. 10 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and read and/or write data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology used in this specification and/or the terminology that is needed to understand this specification may be replaced by other terms that convey the same or similar meanings. For example, "channels" and/or "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

Furthermore, a radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel.8 to Rel.12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and/or others described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notifying of information is by no means limited to the aspects/embodiments described in this specification, and other methods may be used as well. For example, notifying of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be notified using, for example, MAC control elements (MAC CEs).

Also, notifying of certain information (for example, notifying of "X holds") does not necessarily have to be notified explicitly, and can be notified implicitly (by, for example, not notifying this certain information or notifying another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" as used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to as, by a person skilled in the art, a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise.

For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions, (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
    a receiver that receives a plurality of downlink control information which schedule downlink shared channels, wherein Hybrid Automatic Repeat Request Acknowledgement (HARQ-ACK) transmission timings for the downlink shared channels are notified by the plurality of downlink control information, respectively;
    a transmitter that, when the HARQ-ACK transmission timings for the downlink shared channels indicate a same slot, transmits HARQ-ACK information for the downlink shared channels using a Physical Uplink Control Channel (PUCCH) resource in the same slot; and
    a processor that determines a PUCCH resource indicated in a last received downlink control information, among a plurality of PUCCH resources indicated in the plurality of downlink control information, respectively, as the PUCCH resource used to transmit the HARQ-ACK information.

2. The terminal according to claim 1, wherein the processor determines a codebook for at least one HARQ-ACK of the plurality of HARQ-ACKS based upon the HARQ-ACK transmission timing.

3. A radio communication method comprising:
    receiving a plurality of downlink control information which schedule downlink shared channels, wherein Hybrid Automatic Repeat Request Acknowledgement (HARQ-ACK) transmission timings for the downlink shared channels are notified by the plurality of downlink control information, respectively;
    transmitting, when the HARQ-ACK transmission timings for the downlink shared channels indicate a same slot, HARQ-ACK information for the downlink shared channels using a Physical Uplink Control Channel (PUCCH) resource in the same slot; and
    determining a PUCCH resource indicated in a last received downlink control information, among a plurality of PUCCH resources indicated in the plurality of downlink control information, respectively, as the PUCCH resource used to transmit the HARQ-ACK information.

4. A base station comprising:
a transmitter that transmits a plurality of downlink control information which schedule downlink shared channels; and
a receiver that receives Hybrid Automatic Repeat Request Acknowledgement (HARQ-ACK) information for the downlink shared channels scheduled by the plurality of downlink control information, using a Physical Uplink Control Channel (PUCCH) resource that is indicated in a last transmitted downlink control information among a plurality of PUCCH resources indicated in the plurality of downlink control information respectively.

5. A system comprising a base station and a terminal, wherein:
the terminal comprises:
a first receiver that receives a plurality of downlink control information which schedule downlink shared channels, wherein Hybrid Automatic Repeat Request Acknowledgement (HARQ-ACK) transmission timings for the downlink shared channels are notified by the plurality of downlink control information, respectively;
a first transmitter that, when the HARQ-ACK transmission timings for the downlink shared channels indicate a same slot, transmits HARQ-ACK information for the downlink shared channels using a Physical Uplink Control Channel (PUCCH) resource in the same slot; and
a processor that determines a PUCCH resource indicated in a last received downlink control information, among a plurality of PUCCH resources indicated in the plurality of downlink control information, respectively, as the PUCCH resource used to transmit the HARQ-ACK information, and
the base station comprises:
a second transmitter that transmits, to the terminal, the plurality of downlink control information which schedule the downlink shared channels; and
a second receiver that receives the HARQ-ACK information for the downlink shared channels scheduled by the plurality of downlink control information, using the PUCCH resource that is indicated in the last transmitted downlink control information among the plurality of PUCCH resources indicated in the plurality of downlink control information respectively.

* * * * *